United States Patent [19]
Peill et al.

[11] 3,750,557
[45] Aug. 7, 1973

[54] SYSTEM FOR THE VENTILATION OF BUILDINGS

[75] Inventors: Jurgen Eberhardt Peill; Alf Gerritse; Miroslav S. Osmera, all of Canning, N.S., Canada; Christian Karmark Andersen, Naestved, Denmark

[73] Assignee: Nordisk Ventilator Co. Aktieselskab, Naestved, Denmark

[22] Filed: Nov. 9, 1971

[21] Appl. No.: 197,128

[30] Foreign Application Priority Data
Nov. 16, 1970 Canada .................................. 98,213

[52] U.S. Cl. ........................................ 98/33, 98/35
[51] Int. Cl. ............................................ F24f 13/00
[58] Field of Search ..................... 98/33 R, 33 A, 35

[56] References Cited
UNITED STATES PATENTS

| | | | |
|---|---|---|---|
| 2,189,008 | 2/1940 | Kurth | 98/33 R |
| 2,595,370 | 5/1952 | Rygard | 98/33 R |
| 2,751,760 | 6/1956 | Williams | 62/289 |
| 2,939,297 | 6/1960 | Karger | 62/298 |
| 3,487,767 | 1/1970 | Kristiansen | 98/33 R |

Primary Examiner—William J. Wye
Attorney—Richard C. Sughrue, Robert J. Seas, Jr. et al.

[57] ABSTRACT

A system for the ventilation of buildings, comprising vertical and concentrical exhaust and injection ducts extending from a fan section located in the room to be vented to a roof hood and between said ducts a passage for recirculating part of the exhausted air to the injection duct, damper means in the form of a single unit comprising two adjustable damper members being provided in said exhaust and injection ducts and said passage for controlling the ventilation to any desired condition between full supply of fresh air and full recirculation without supply of fresh air, said damper members being constructed as double-walled elements made of a plastic material, in which a porous insulating material may be provided in the cavity between the walls. In a method for manufacturing such a damper member said member is poured from a plastic foam.

7 Claims, 3 Drawing Figures

SYSTEM FOR THE VENTILATION OF BUILDINGS

This invention relates to building ventilation systems and more particularly to a system for the ventilation of agricultural buildings such as stables, comprising fan means and control devices attached thereto for producing an air flow through the interior of such a building, which is constant in time and is adapted to the characteristics of said building, so that a fully automatic, draughtless ventilation thereof is obtained.

Ventilation systems of this kind comprise injection and exhaust ducts for connecting the interior of the building to the ambient air through a roof hood located above the roof of the building, which ducts are interconnected by a passage of variable cross-sectional area, by means of which a smaller or greater part of the air exhausted from the interior of the building may be recirculated into the injection duct. The supply of fresh air as well as the amount of recirculated air is usually controlled by adjustable damper means, by means of which the ventilation may be adjusted to any desired value between a maximum supply of fresh air, in which case the interior of the building is fully exposed to the ambient air through the injection and exhaust ducts, whereas the passage between said ducts is closed, so that no recirculation takes place, and a total recirculation, in which case the passage between the ducts is fully open, whereas the part of each duct situated between said passage and the roof outlet of the duct is closed. The fan means is constantly operated, so that the volume of air supplied to the interior of the building and the volume of air exhausted therefrom per time unit equal each other and are maintained at constant values.

The ventilation provided by such a system is controlled in dependence on inter alia, outdoor weather conditions, so that in warm summer periods the damper means is adjusted to a maximum supply of fresh air, whereas in cold winter periods a total recirculation is provided without access for the ambient air.

In known ventilation systems of this kind the problem often arises that in periods of total recirculation, the relatively high moisture content in the recirculated air tends to produce water condensation on the damper means, which usually consist of simple metal-plate dampers, owing to the fact that the temperature of such dampers will be substantially equal to the low outdoor temperature, as a result of which the recirculated air passing said dampers will be cooled to a temperature below the dew point. In cold winter periods ice formations can, as a result herof, be produced on the dampers to such a degree that adjustment of the dampers may be impeded. Furthermore, the water condensed on the dampers may drip down into the stable which is very harmful to the animals owing to the fact that this condensed water may be polluted by detrimental gases, dirt, etc., originating from the air exhausted from the stable and by metal compounds formed by chemical reactions between the exhaust air and the various metal parts of the duct system including the dampers themselves. Particularly in poultry farming, this phenomenon represents a serious risk to the health of the animals. In addition, the dampers are, as a result of the water condensation, exposed to severe corrosion, which may also be harmful to the possibilities of adjusting the ventilation by means of said dampers and thus to the proper operation of the entire system.

It is an object of the invention to provide an improved ventilation system, in which the risk of water condensation is avoided or considerably reduced.

It is a further object of the invention to provide an improved damper member of a simple and cheap construction, which can be manufactured at low costs.

A still further object of the invention consists in the provision of methods for manufacturing such a damper member.

In accordance herewith the invention provides a system for the ventilation of buildings, for example stables, comprising substantially vertical injection and exhaust ducts for connecting the interior of the building through the roof thereof to the ambient air, fan means for generating an air flow from the injection duct through the interior of the building to the exhaust duct and a passage between said injection and exhaust duct for recirculating part of the air exhausted from the interior of the building to the injection duct, in which system variable damper means are arranged in said injection duct, said exhaust duct and said passage for controlling the supply of fresh air and varying the amount of air recirculated to the injection duct, wherein at least the damper means arranged in said passage between the injection and exhaust ducts comprise at least one double-walled damper member made of a plastic material.

A damper member constructed in accordance with the invention possesses highly enhanced heat insulation properties relative to normal metal plate dampers. As a result hereof a considerable temperature difference may exist between the sides of said damper member facing the cold ambient air and the interior of the building, respectively, so that the last-mentioned side of the damper member can be maintained at a higher temperature, at which water condensation does not take place.

In a preferred embodiment of the invention the damper member is made from fibreglass-reinforced plastic material. Thereby, an excellent rigidity of said member is ensured.

A still further improvement may be obtained by filling the cavity between the double walls of the damper member with a porous insulating material, which may preferably be a plastic foam.

The present invention is of particular interest in a system for the ventilation of buildings, for example stables or barns, comprising substantially vertical injection and exhaust ducts for connecting the interior of the building through the roof thereof to the ambient air, of which the injection duct is arranged concentrically around the exhaust duct, in which system a fan-driving motor is arranged axially in said exhaust duct, said motor being operatively connected to a fan-wheel which is provided with two concentric, rigidly interconnected sets of vanes of the type used in axial flow fans, one set being located in the injection duct and the other in the exhaust duct, while in said injection and exhaust ducts as well as in a passage between said ducts adjustable damper means are provided, which is constructed as a single unit comprising two semi-cylindrical damper members, the diameter of which corresponds to the diameter of the partition between said injection and exhaust ducts, each of which damper members is pivotable around an axis forming a diameter in said ducts as well as in said members, and each of which is bevelled at the top end thereof in such a way that said bevels form the same angle with the separating plane of said semi-cylindrical members, when said members are in a position in which they are in substantial alignment with said partition, said damper members being furthermore provided with outwardly extending flanges at the edges thereof abutting each other in said position, the outer edges of said flanges and the lower edges of said damper members being shaped in such a way that in a position in which said bevelled top edges abut upon each other, the projections of said outer and lower edges on a normal plane to said ducts form a circle, the radius of which corresponds to the inner radius of said injection duct, wherein said semi-cylindrical damper members are both double-walled and made of a plastic material.

In such a system, the damper members are, in case of full recirculation, exposed on one side directly to the cold ambient air and on the other side directly to the warm recirculated air. By shaping said members in accordance with the invention as double-walled constructions of a plastic material, the risk of water condensation is considerably reduced so that ice formation and other drawbacks resulting herefrom are substantially avoided.

According to the invention, one method for manufacturing a damper member for use in a ventilation system of the kind referred to involves the steps of pouring the member from plastic foam and subsequently applying a coating of a harder plastic material thereon.

Another very simple and cheap method for manufacturing a damper member for use in such a ventilation system involves the steps of pouring said member to form a structural foam plastic material, during the hardening of which porosities are formed in the interior of said material, whereas surface zones thereof become relatively hard and solid.

An embodiment of the invention will now be described in greater detail with reference to the accompanying drawings, in which.

Figure 1:
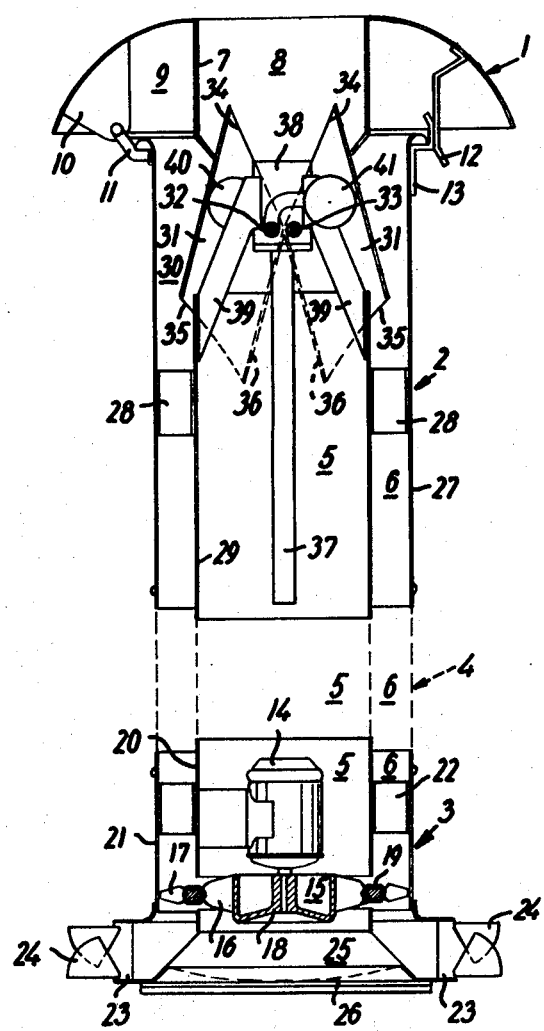
FIG. 1 shows a schematic cross-sectional view of the complete ventilation system.

The ventilation system shown in FIG. 1 of the drawings comprises three main parts, viz. a roof hood 1, a control or damper section 2 and a fan and outlet section 3, of which the sections 2 and 3 are interconnected by means of a duct section 4 shown in dotted lines, said section being formed by concentric tube sections and forming parts of an exhaust duct 5 and an injection duct 6 arranged concentrically around said exhaust duct, said exhaust and injection ducts extending throughout the ventilation system from the roof hood 1 to the fan and outlet section 3.

This ventilation system is adapted for use in a building, for example a stable, so that the roof hood 1 is located above the roof of said building, whereas the fan and outlet section 3 is located directly below the ceiling of a room to be vented. The length of the duct section 4 is, therefore, adapted to the actual proportions of the building, in which the ventilation system is to be used.

The roof hood 1 is, by means of a partition 7 forming a circular cylinder, divided into two spaces 8 and 9 forming outlet passages for connecting the exhaust duct 5 and the injection duct 6, respectively, to the ambient air. By means of flanges, of which only one is indicated in FIG. 1 by 10, the roof hood 1 is pivotably mounted on arms 11 secured to the top end of the damper section 2, so that it can be tilted and, thereby, provide access for inspection and cleaning of said damper section. On the opposite side of said ducts, snap springs 12 and 13 are secured to the roof hood 1 and the damper section 2, respectively, for fastening the roof hood to said damper section.

The fan and outlet section 3 comprises a fan driving motor 14, which is operatively connected to a fan wheel 15 carrying two concentric sets of vanes 16 and 17, of which the vanes 16 are secured in one end to a hub 18 and in the other end to one side of a ring 19, to the other side of which the vanes 17 are secured. The vanes 16 and 17 of the two sets have mutually opposite inclinations, so that the air flow produced by one vane set will be oppositely directed relative to that produced by the other; thus, in the example shown the air flow produced by the vane set 16 will be directed upwards and the air flow produced by the vane 17 will be directed downwards.

The fan driving motor 14, the fan wheel 15 and the vane sets 16 and 17 are mounted in tube sections 20 and 21 defining the part of the exhaust and injection ducts 5 and 6 extending through the section 3, said tube sections 20 and 21 being arranged coaxially around the fan 14–17 in such a way that one tube section 20 is in alignment with the ring 19, whereas the other tube section 21 surrounds the outer vane set 17, the tube sections 20 and 21 being rigidly interconnected by means of connecting members 22.

The injection duct is at the bottom provided with a number of outlets in the form of nozzles 23, the axes of which extend perpendicularly to the axis of the ducts 5 and 6, said nozzles being equally spaced along the circumference of the injection duct with an angle of e.g., 30° between two nozzles succeeding each other, so that the total number of inject nozzles is twelve. Each of the nozzles 23 comprises a pair of guide blades 24, which are individually adjustable so that the direction of the air injected in the room from said nozzle may be chosen in accordance with the characteristics of the room, particularly the presence of any flow hindrance in the vicinity of the nozzle.

The exhuast duct 5 is at the bottom connected to the interior of the room to be vented through a conical outlet 25 which is closed by a grid 26 which serves for preventing greater particles of dirt etc. from entering the exhaust duct. For cleaning purposes said grid may be detachably mounted over the opening 25.

The control or damper section 2 has an outer wall in the form of a tube section 27 having the same diameter as the tube section 21, which tube section 27 is by means of connecting members 28 rigidly connected to a concentrical, internal tube section 29 having the same diameter as the tube section 20, said tube section 29 extending, however, only through the lower portion of the damper section 2, whereas in the top portion thereof there is an opening 30 forming between the exhaust duct 5 and the injection duct 6 a passage, the magnitude of which can be varied by the damper means, which is in the embodiment shown constructed in such a way that by operating said damper means the passages through the exhaust and injection ducts are simultaneously controlled, so that said passages are fully blocked when the opening 30 has its maximum magnitude, whereas they are fully open when the opening 30 is closed.

Figure 2:
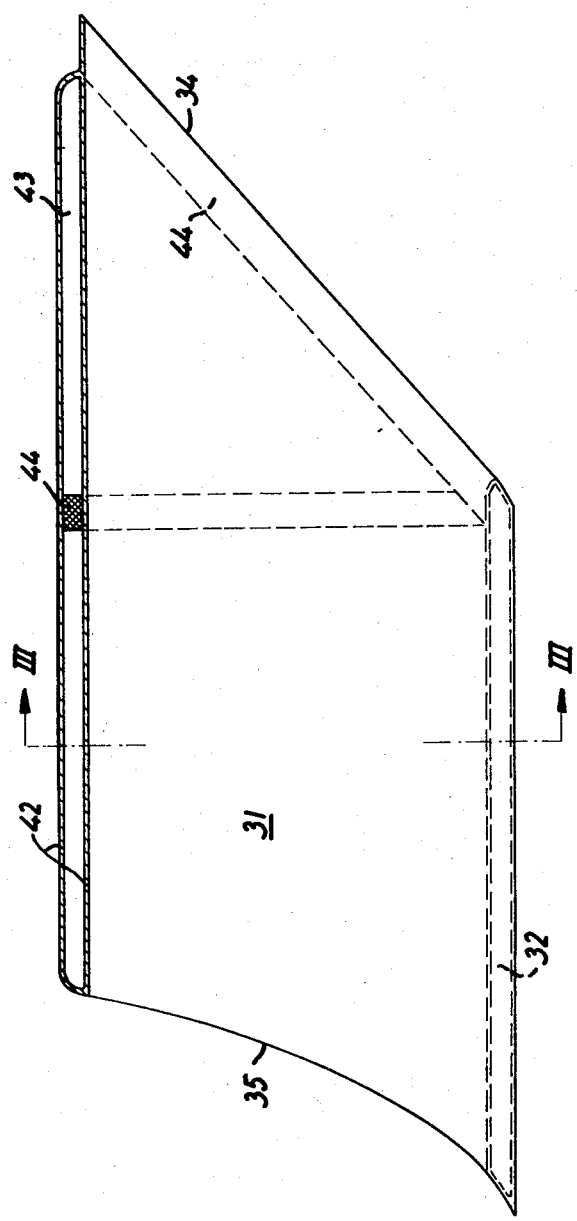
FIG. 2 shows a longitudinal section of a damper member used in the system shown in FIG. 1.
Figure 3:
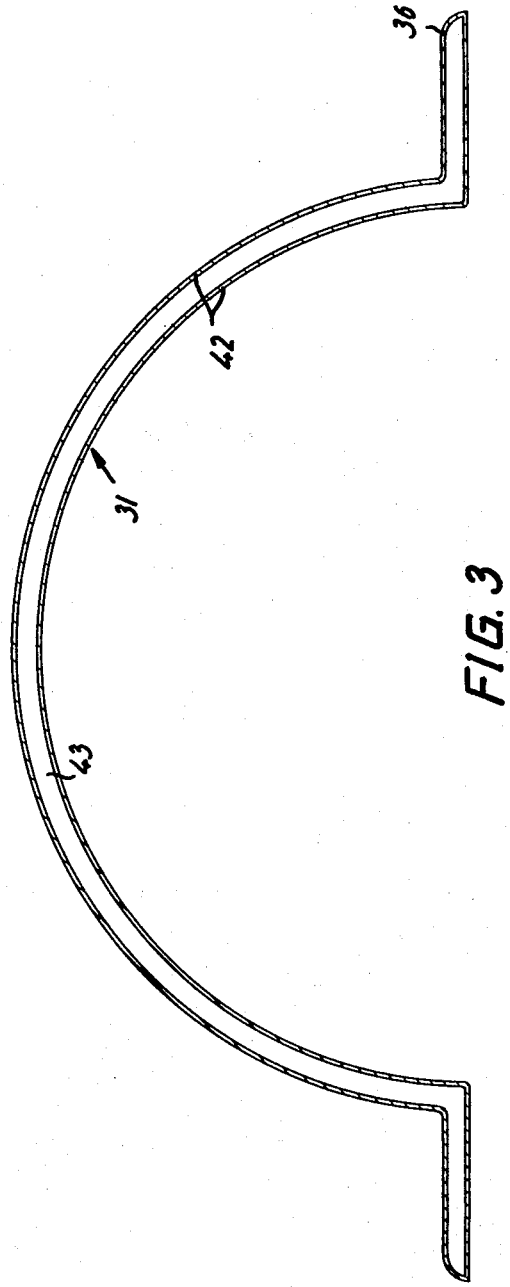
FIG. 3 shows a cross-sectional view taken along the line III—III in FIG. 2.

As shown in FIG. 1 said damper means is constructed as a single unit comprising two semi-cylindrical damper members 31, which are shown in greater detail in FIGS. 2 and 3, and the diameter of which correspond to the diameter of the tube section 29, which form the partition between the parts of the exhaust and injection ducts 5 and 6 extending through the damper section 2. The damper members 31 are journalled rigidly on shafts 32 and 33, which are perpendicular to the axis of the ducts 5 and 6 as well as to the axes of the semi-cylindrical members 31 themselves, so as to be pivotable by rotation of said shafts. The shafts 32 and 33 are situated at one end edge 34 of each damper member 31, which is bevelled in such a way that said bevelled edges form the same angle with the separating plane of the members 31, when these members are in a position, in which they are aligned with the tube section 29.

Each of the damper members 31 is in the opposite end cut off along an end edge 35, which follows a curve forming the sectional curve between the tube section 27 and said member, when the members 31 are in a position, in which the bevelled edges 34 abut upon each other. Furthermore, each of the dampers 31 is, at the side edges thereof, provided with outwardly extending flanges 36, which lie in a common plane through the axis of said member such as shown in FIG. 3, and which have such a shape that they abut upon the tube section 27, when the damper members 31 are in the above-mentioned position with the bevelled edges 34 abutting upon each other. Thus, in the said position, the projections of the edges 35 of the damper members 31 and of the outer edges of the flanges 36 on a normal plane in the ducts will describe a circle, the radius of which corresponds to the inner radius of the tube section 27, so that in said position the parts of the exhaust and injection ducts situated above the damper members 31 are completely blocked by these members, whereas the opening 30 has its maximum magnitude, so that the air flow produced by the fan is completely recirculated. On the other hand, in a position in which the flanges 36 abut upon each other, the exhaust and injection ducts 5 and 6 are completely open, whereas the passage formed by the opening 30 is completely blocked.

The position of the damper members 31 may be adjusted manually. However, in most cases an automatic control is preferred by which the adjustment of the position of the damper members is performed in dependence on temperature and/or humidity conditions in the room to be vented.

For this purpose the ventilation system shown in FIG. 1 comprises a thermo-hydraulic control device 37 arranged in the axial line of the duct 5, in which a piston is moved, which effects movement of the members 31 through a suitable transmission arranged in a casing 38 which is secured to the tube section 29 by means of connecting members 39, and to the bottom of which said control device 37 is secured, which transmission comprises, for example, a rack which is rigidly connected to the piston in the device 37 and meshes with gears secured on the shafts 32 and 33 on each of which one the members 31 is also secured. In order to facilitate movement of the members 31, counterweights 40 and 41 may be secured to the shafts 32 and 33, respectively. However, the more detailed construction of the control device does not form part of the present invention and needs no further description.

As already mentioned hereinbefore the control of the ventilation is furthermore, to be performed in dependence on weather conditions in the ambient air. Thus, in warm summer periods a maximum supply of fresh air is produced by adjusting the damper members 31 to the position in which the flanges 36 abut upon each other and said members are aligned with the tube section 29, so that fully open air passages are formed in the injection and exhaust ducts 6 and 5 between the ambient air and the room to be vented, e.g., a stable or a barn. On the other hand, in cold winter periods the members 31 are adjusted to the position in which the bevelled edges 34 abut upon each other and the edges 35 and the flanges 36 adjoin the inner surface of the tube section 27, so that no air flow can be established between the ambient air and the stable or barn. In this case, a complete recirculation is produced by the fan through the exhaust duct 5, the opening 30 and the injection duct 6.

Moreover, as mentioned hereinbefore, known systems of the kind described in which essential parts of the system are made of metal such as simple steel plate, have the disadvantage that in periods where complete recirculation is established, the relatively high moisture content of the recirculated air will tend to produce water condensation on the underside of the damper members owing to the fact that said members are, on the other side exposed to the cold ambient air, as a result of which they attain a temperature, at which the recirculated air passing the members is cooled below the dew point. As described in the foregoing a number of drawbacks arises hereby, of which particularly the risk of ice formation may be harmful to the possibilities of adjusting said members within the complete control range.

According to the present invention this problem is solved by constructing the damper members 31 as double-walled elements made from a plastic material. As a result hereof, highly improved heat insulation properties of said members are obtained, so that a considerable temperature difference may exist between the cold top side thereof and the underside facing the warmer air in the room to be vented, which may be a stable. Thereby, the tendency to water condensing may be eliminated or at least reduced to a degree at which no harmful effect on the ventilation can be observed.

A semi-cylindrical damper member 31 of such a doublewalled construction is shown in FIGS. 2 and 3 in a longitudinal section and a cross-sectional view, respectively. The geometrical characteristics of the damper member shown in these figures are the same as described with reference to FIG. 1 of the drawings.

In the embodiment shown the damper member 29 have double walls 42 and are made of a plastic material, which may be a fibreglass-reinforced plastic, with a uniform spacing 43 between the walls. This cavity may contain just plain air. However, improved insulation properties are obtained by filling said cavity with a porous insulating material, which may, for example be a plastic foam. In order to obtain a more rigid construction, supporting ribs 44 may be provided in said cavity and along the edges of the member 28, as shown at the edge 30 in FIG. 2.

The damper member 31 shown in FIGS. 2 and 3 represents a simple construction, which may be manufactured at low cost, and offers a considerable improvement over ordinary metal plate dampers.

According to the invention one particular simple and cheap method for manufacturing such a damper member involves the steps of pouring said member from a plastic foam and subsequently applying a coating of a suitable harder plastic material thereon. To obtain a more rigid construction by means of such a method, the plastic foam may be poured around supporting ribs made from fibreglass-reinforced plastic. The coating of a harder plastic material may be applied by spraying.

However, a damper member for use in a ventilation system of the kind referred to may also be manufactured by means of another method involving the steps of pouring said member from a structural foam plastic material, during the hardening of which porosities are formed in the interior of said material, whereas surface zones thereof become relatively hard and solid. By using said method a double-walled damper member, in which the cavity between the walls is filled with a porous insulating material, is obtained as a result of the characteristics of said material itself in that the double walls is formed by the hard surface zones of said material, whereas the insulation in said cavity is constituted by the internal zone of said material, in which porosities are produced during the hardening of the material.

What we claim is:

1. In a system for the ventilation of buildings, for example stables, said system comprising substantially vertical injection and exhaust ducts connecting the interior of the building through the roof thereof to the ambient air; fan means for generating an air flow from the injection duct through the interior of the building to the exhaust duct; a common partition separating said injection and exhaust ducts and including an opening forming a recirculation passage from the exhaust duct to the injection duct; a damper unit movably positioned in said ducts at said recirculation passage and including at least one damper member arranged to be adjustable to any position between two extreme positions, in one of said extreme positions the damper member is aligned with said common partition and said recirculation passage is closed, and in the other extreme position the damper member extends transversely to the ducts to close both the injection duct and the exhaust duct from the ambient air and open both of said ducts for full recirculation through said recirculation passage, wherein the improvement comprises that said damper member is comprised of a double-walled member, said walls of said member forming a closed cavity and are made from a plastic material.

2. The improvement as claimed in claim 1, wherein said plastic material is a fiberglass-reinforced plastic.

3. The improvement as claimed in claim 1, further comprising supporting ribs of a fiberglass-reinforced plastic material provided in said cavity.

4. The improvement as claimed in claim 1, wherein said cavity is filled with a porous insulating material.

5. The improvement as claimed in claim 4, wherein said insulating material consists of plastic foam.

6. The improvement as claimed in claim 5, wherein the walls of said damper member are formed as non-porous surface layers of the plastic foam.

7. The improvement as claimed in claim 5, wherein the walls of said damper member are formed as surface layers of a harder non-porous plastic material on the plastic foam and integral therewith.

* * * * *